United States Patent [19]
Mounsey

[11] 3,835,572
[45] Sept. 17, 1974

[54] FISHING LURE
[76] Inventor: Reginald Mounsey, Hannon St., Sea Lake, Australia
[22] Filed: July 10, 1972
[21] Appl. No.: 269,938

[30] Foreign Application Priority Data
July 15, 1971 Australia............................ 5558/71
Sept. 28, 1971 Australia............................ 6454/71

[52] U.S. Cl. ............................................. 43/42.06
[51] Int. Cl............................................. A01k 85/00
[58] Field of Search.................. 43/42.06, 41, 44.99

[56] References Cited
UNITED STATES PATENTS
| 2,102,739 | 12/1937 | Peters...................... 43/41 |
| 2,465,127 | 3/1949 | Stark................... 43/41 X |
| 2,869,279 | 1/1959 | Pretorius.................. 43/42.06 |
| 2,922,246 | 1/1960 | Mileschuk.................. 43/42.06 |
| 2,937,467 | 5/1960 | Capps................... 43/42.06 |

FOREIGN PATENTS OR APPLICATIONS
| 1,090,612 | 10/1957 | France............................ 43/42.06 |
| 1,150,413 | 8/1957 | France............................ 43/42.06 |

Primary Examiner—James H. Czerwonky
Attorney, Agent, or Firm—Diller, Brown, Ramik & Wight

[57] ABSTRACT

A fishing lure formed of a body member having a chamber defined therein for receiving a dispersible bait, and at least one opening in a wall of the member to allow bait to escape from the chamber. The bait is pre-prepared and may be in any form, but is such that it will dissolve or be broken down by contact with water. The body member is arranged so that water can pass through the bait chamber so as to progressively dissolve or break down the body of bait contained therein, and carry that bait out of each escape opening. At least one barbed hook is attached to the body member. Check-valve means are mounted in the chamber to prevent inadvertent removal of the bait through the bait admitting aperture of the lure.

6 Claims, 10 Drawing Figures

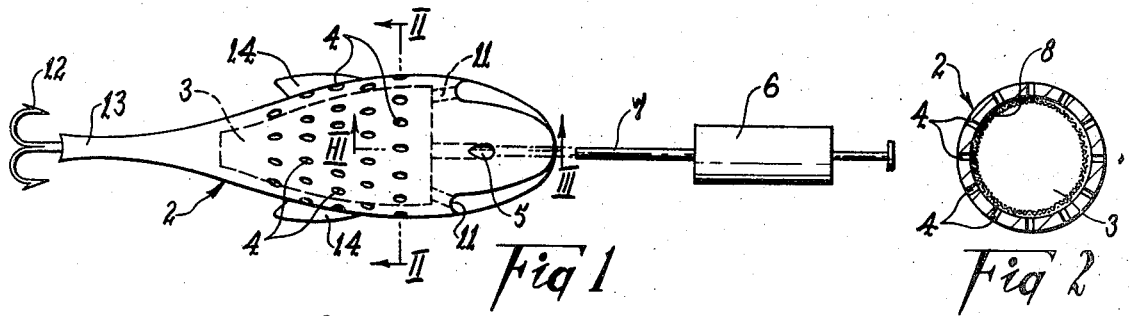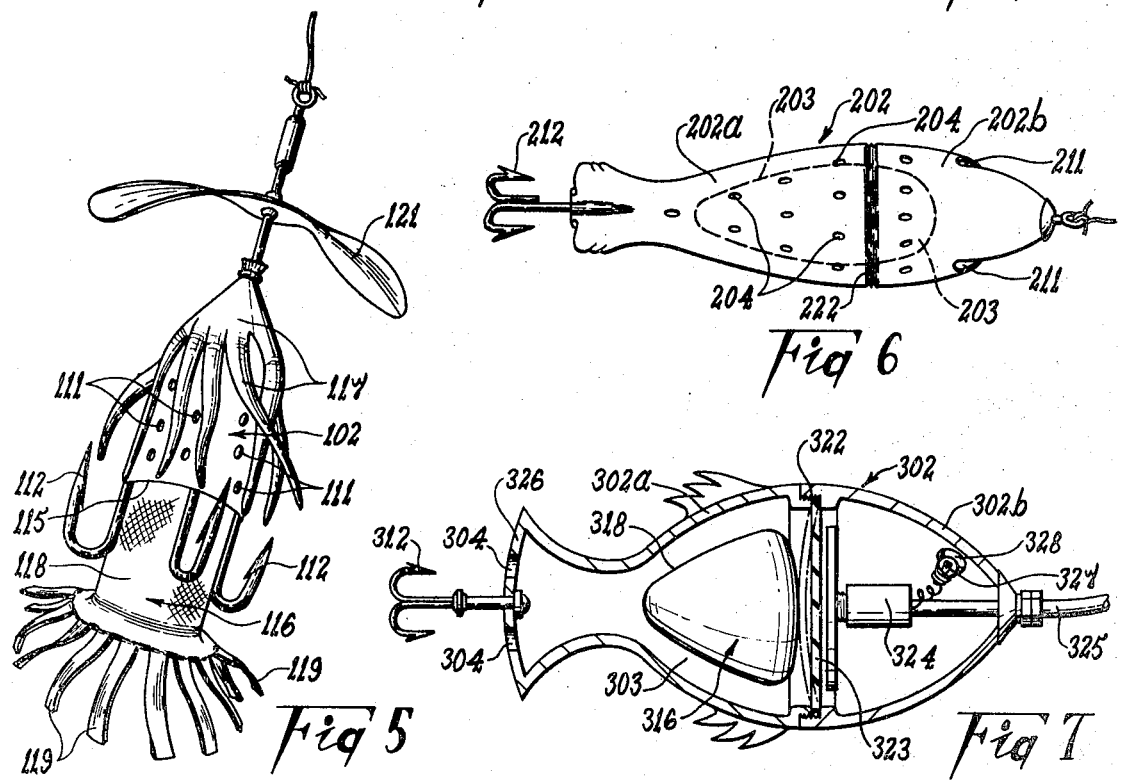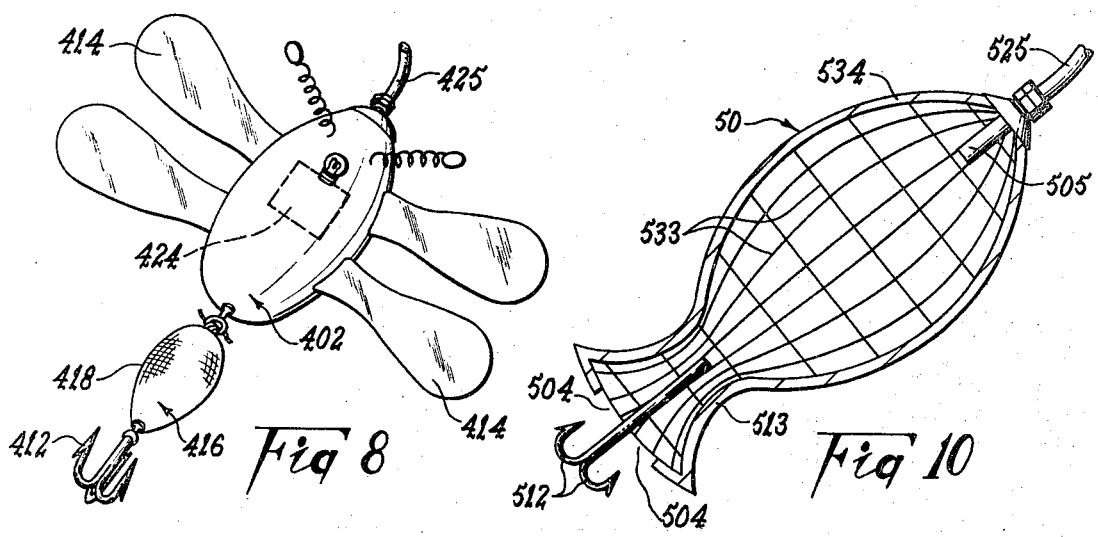

FISHING LURE

This invention relates to fishing lures and has for its principal object to overcome disadvantages inherent in the two main types of lures now in common use.

Perhaps the most common lure is the conventional fish-hook with bait attached, and the disadvantages of that type are well known - attachment of the bait is inconvenient and quite often unpleasant, and the lure requires constant checking to see that the bait is still in place. The other type of lure is in the form of a plain decoy having no edible bait attached, and therefore relies purely on appearance. The plain decoy type of lure is made in many varied forms, most of which are intricate and expensive, since a decoy that is effective for one type of fish is seldom effective (at least to the same degree) for another type of fish.

The aim of the present invention is to provide a lure which combines the advantages of the two principal types mentioned, whilst avoiding their disadvantages. That is, an object of the invention is to provide a lure which is convenient to use in the manner of the aforementioned plain type of decoy, but has edible bait associated therewith without requiring unpleasant attachment of live or other natural animal bait, and consequently does not rely on appearance alone for its effectiveness.

In a rather fundamental form of the invention, the lure includes a hollow member which defines a bait receiving chamber, and at least one outlet opening is provided in a wall of that chamber to permit discharge of the bait. The bait may be in any appropriate form such as liquid, paste, powder or solid block form. In any of those forms, the lure may be precharged with a quantity of bait which will progressively escape from the bait chamber when the lure is placed in water. Instead of precharging the lure, liquid or paste may be fed to the bait chamber through a hollow feed line connected to a bait reservoir, and that feed can be under gravity or pressure (e.g. a hand or battery operated pump).

At least one barbed hook is preferably associated with the lure so as to be adjacent the bait escape opening or openings. As the bait escapes from the lure and moves away it will naturally spread and become progressively diluted, and fish detecting the presence of that diluted bait will be attracted towards the more concentrated body of bait emerging adjacent the hook. Thus, such a fish will be tempted to take the hook, particularly if the hook is disguised in some manner so as to have the appearance of natural fish food.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

In the drawings:

FIG. 1 is a diagrammatic view of one particular embodiment of the invention adapted to be charged with bait from a syringe or gun;

FIG. 2 is a cross-sectional view taken along line II—II of FIG. 1;

Figure 9:
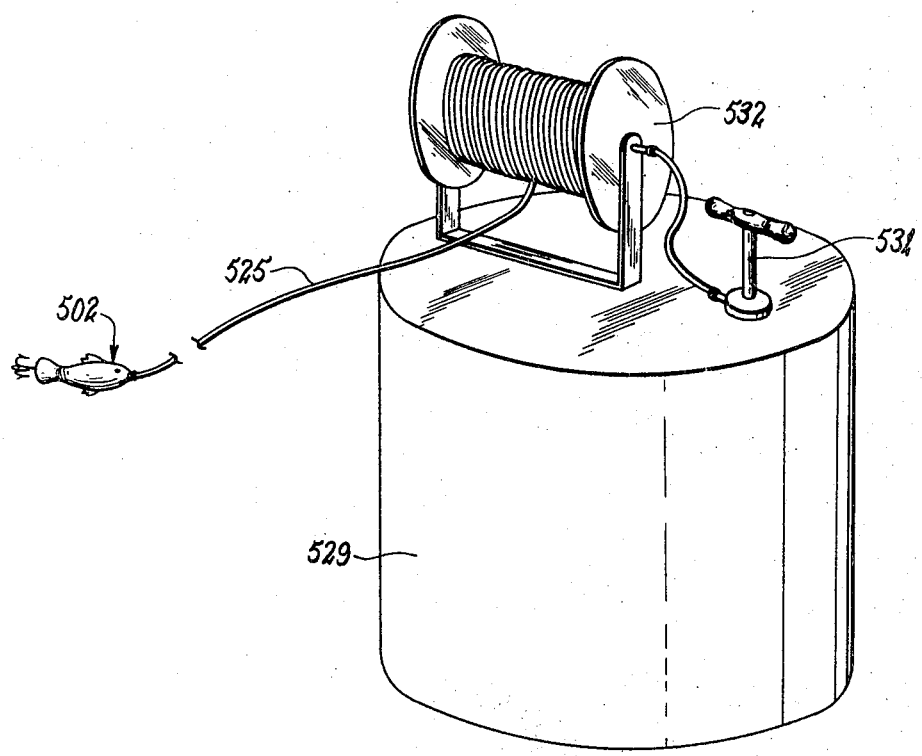
Figure 3:
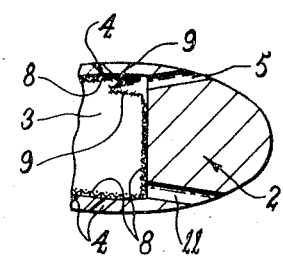
Figure 4:
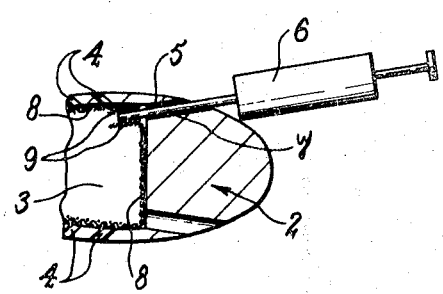

FIG. 3 on the sheet containing FIG. 9 is an enlarged cross-sectional view taken along line III—III of FIG. 1;

FIG. 4 on the sheet containing FIG. 9 is a view similar to FIG. 3 but showing the charging nozzle inserted into the lure;

FIG. 5 is a view of another embodiment of the invention;

FIG. 6 is a view of still another embodiment of the invention;

FIG. 7 is a longitudinal sectional view of yet another embodiment of the invention;

FIG. 8 is a view of still another embodiment of the invention;

FIG. 9 is a semi-diagrammatic view of an embodiment of the invention including a bulk bait supply; and FIG. 10 is a longitudinal sectional view of the lure device shown in the embodiment of FIG. 9.

It will be appreciated that the basic principles of the invention can be embodied in numerous and rather diverse lure constructions. The particular constructions hereinafter described are examples of some of the more practical embodiments available, and as mentioned above each of those constructions is open to modification without departing from the concept of the invention.

Considering the embodiment of FIG. 1, the lure includes a body 2 of appropriate material such as a plastics material, having a bait receiving chamber 3 defined therein. A number of escape apertures 4 are provided through the sides of the body 2 so as to communicate with the chamber 3, and a charging passage 5 is formed through the front of the body 2 to also communicate with the chamber 3. As shown in FIG. 1, bait in liquid, powder, or paste form may be introduced into the chamber 3 by means of a syringe or gun 6 having a nozzle 7 which is insertable into the passage 5. The syringe or gun 6 can take any appropriate form other than that particularly shown, and the bait may be prepacked in a cylinder or capsule (not shown) for ready location within the syringe or gun 6. Preferably however, the bait is in paste form and is provided in a collapsible tube which can be used on several occasions to refill the charging syringe or gun 6.

It is generally convenient to line the chamber 3 with a mesh 8 of wire or other material as shown in FIGS. 2, 3 and 4, or at least line the sides of that chamber through which the apertures 4 pass so that the mesh 8 controls egress of bait through the apertures 4 within acceptable limits. FIGS. 3 and 4 show one particular valve arrangement for preventing premature ejection of bait from the chamber 3 through the charging passage 5, and in that arrangement two edge portions 9 of the mesh 8 are turned inwardly to define a lip valve, and the portions 9 of that valve are separable by the nozzle 7 as shown in FIG. 4, or simply by pressure of bait ejected from that nozzle. In use, the passage 5 serves as a water inlet, and if desired additional water inlets 11 may be provided through the front of the body 2 as shown in FIG. 1. Also as shown in FIG. 1, a number of barbed hooks 12 are secured to the tail portion 13 of the body 2, and fin-like elements 14 may be attached to the body 2 give the lure a life-like or realistic appearance.

According to the embodiment of FIG. 5, the lure body 102 is a hollow frame-like member having an open end or mouth 115 through which bait 116 in pre-packed or cartridge form can be inserted into the chamber defined by that body. A number of hooks 112 are attached to or formed integral with the body 102 so as to extend outwardly therefrom as shown, and a drape 117 of plastics material for example can be secured to the front or nose of the body 102 if desired. The bait 116 can be of block or powder form, and in the arrangement particularly shown it is contained within a mesh or porous bag or cover 118 having a flexible fringe 119 secured thereto. Obviously such a cover need not be provided in all instances. The bait 116 can be retained within the body 102 by a wire tie or any other suitable means.

Apertures 111 through the wall of the body 102 allow entry of water to the bait chamber to dissolve or break down the bait and cause it to disperse. Instead of a perforated cylindrical member as shown, the body 102 could be formed of a wire frame. A spinner element 121 may be attached to the front of the body 102 to add to its attraction.

FIG. 6 illustrates an embodiment in which the lure body 202 is formed in two parts 202a and 202b, which are releasably securable by a snap connection 222, although any other connection such as a screw threaded arrangement could be used. In the construction shown, a portion of the bait chamber 203 is formed in each of the body parts 202a and 202b, but it will be understood that one part may simply form a closure for the chamber when it is formed entirely in the other part. In all other respects this embodiment is generally the same as that of FIG. 1 except that it does not include a charging passage. That is, it includes water inlets 211, bait escape apertures 204, and hooks 212. The bait used with this embodiment can be in the form of a capsule which may be solid and/or contained within a porous or mesh bag, or it may be formed by a number of separate and solid pellets or capsules.

In the embodiment of FIG. 7, the body 302 is divided into two parts 302a and 302b as in the FIG. 6 embodiment, except that the chamber 303 is formed in part 302a only and the connection 322 is a screw connection, although a snap connection could be used. A flexible diaphragm 323 forms the separation wall between the interior of the two parts 302a and 302b, and a small electrically actuated vibrator 324 is contained within the part 302b and arranged to cause movement of the diaphragm wall 323. The vibrator 324 is preferably battery operated through a battery contained within the lure body 302 or located remote from the lure such as at the reel (not shown) holding the strain resistant line 325 to which the lure is attached. Conductor wires (not shown) connecting the battery and vibrator 324 may extend along or be formed integral with the line 325.

When the parts 302a and 302b are separated, the bait 316 can be located within the chamber 303, and that bait can be of any suitable type. For example, the bait may be a solid or pliable capsule contained within a porous or mesh bag 318. Alternative to such a bag, a mesh retainer wall (not shown) may be located within the part 302a. Escape apertures 304 are formed through a rear wall 326 of the body 302, and barbed hooks 312 are connected to that wall. If desired, a small globe 327 may be activated through the operating circuit of the vibrator 324 so as to glow through a transparent window 328.

In use, the vibrator 324 functions to flex the diaphragm wall 323 with the result that a pumping action is produced within the chamber 303 and bait is intermittently ejected through the apertures 304. Water enters the chamber 303 to dissolve the bait 316 through the apertures 304, but additional apertures (not shown) may be provided adjacent the connection 322 if desired. The resulting forced ejection of bait can also impart motion to the lure which can improve its effectiveness in attracting fish.

A variation of the FIG. 7 embodiment is shown in FIG. 8, and in that variation the vibrator 424 is operatively attached to fin or wing-like elements 414 so as to cause movement of those elements to give the lure a life-like appearance. The bait 416 is located separate from the main body 402 of the lure, and is contained within a porous or mesh cover 418. Hooks 412 are attached to the bait cover 418.

FIG. 9 shows a bulk bait system using bait in liquid form (although under some circumstances paste or powder bait may be used) which is contained within a reservoir or tank 529 having a pump 531 associated therewith. The pump 531 is arranged to force bait into a tubular line 525 which can be wound on a reel 532 for storage purposes, and has its free end attached to a lure body 502. The body 502 is arranged to receive liquid bait from the line 525, and may be as shown in FIG. 10.

In the FIG. 10 embodiment, the body 502 is formed of a wire frame 533 surrounded by a covering 534 of a flexible porous material. Bait enters the chamber 503 through the entrance nozzle 505 and escapes through the pores of the covering 534 and escape opening 504 in the rear wall of the body. Hooks 512 are secured to the tail section 513 of the lure.

It will be appreciated that a number of separate lines 525 may be connected to the tank 529, and control valves may be provided to enable selection of lines for operation.

In any of the embodiments so far described the actual hook or hooks may be camouflaged by a body of porous material which will act to retain some of the bait and therefore function as a positive attraction for fish. In addition or alternatively, a red reflector or other visual attraction may be attached to the hook or the line or other member associated therewith.

The actual composition of the bait may vary according to requirements, but it is proposed that such bait could be made from natural fish foods such as squid, yabbies, blood, meat of various kinds, mussels and other shell fish, etc. The basic food component of the bait can be mixed with other materials in order to preserve the quality of the bait and to provide it with suitable flow characteristics. The base ingredient of the bait can be mixed with a binding and/or dispersing agent such as liquid glass or gelatine. The bait mix may also include one or more trace elements such as iodine. Frozen bait may be distributed in containers arranged for attachment to or insertion into the basic lure element.

Bait in cartridge (solid or pliable) and pellet form is made so as to dissolve or be broken down by contact with water, but the composition is preferably such that the bait will not completely dissolve or disperse in a short time.

According to another embodiment of the invention not shown in the drawings, the actual lure element is in the form of an elongated member having one end attachable to a line and the opposite end weighted so that the member will tend to rest in an upright position when located on the sea bed or the bed of a river. That tendency may be further enhanced by providing a sealed air chamber at the end portion of the member that is attachable to the line. The weighted nose portion of the member may be removable through a screw connection so as to enable variation of the weight. At least one hook is attached to the side of the member and may be a multi-barbed hook preferably located within a recess so that little or no part of the hook projects beyond the surface of the member when that member is correctly positioned upright. The hook mounting is preferably such that the hook is able to swing outwardly when the elongated member is turned onto its side.

Bait may be provided in or to the lure in any of the ways previously described. A reflector or other visually attractive device may be also associated with each recess. Thus, this embodiment may function in the same general manner as the previous embodiments, but when the member is disturbed by a fish seeking the source of the concentrated bait, it will be moved onto its side with the result that the or each hook is exposed by movement about its pivotal mounting so as to function in the normal manner.

The embodiments of FIGS. 1 and 6 may be modified by including a small battery within the element which is connected to at least one globe which, when activated, serves to light up transparent and preferably coloured eyes provided on the element so as to give it a generally realistic appearance. Alternatively the battery may be located remote from the element and connected to such a globe or globes through wires extending with the normal strain-resistant line from the reel to the lure element. Those wires can be formed integral with the strain-resistant line if desired, and control means may be provided to enable the globe or globes to be activated and deactivated as required.

It is further possible that a vibrator as described in relation to FIGS. 7 and 8, could be operatively connected to fin sections of the lure element of the embodiments of FIGS. 1 and 6 to cause movement of those fins and thereby produce a realistic or life-like affect for the lure.

Obviously, remote radio or sonic wave control means could be employed to effect operation of any of the components previously described. Also, an efflorescent element could be introduced into the bait, whether liquid, powder or solid, so as to give it visual as well as edible appeal.

According to yet another embodiment of the invention not shown in the drawings, the lure body may have a cavity formed therein for containing the bait, and a perforated cover plate is spring influenced to hold the bait within that cavity whilst allowing access of water. That type of bait retainer may be applied to all types of conventional lures such as spinners and trawling lures.

It is of course possible to utilize that bait aspect of the invention in a lure element not having an actual hook associated therewith. That is, the lure could comprise bait in any appropriate form carried by a support adapted for attachment to a line. For example, the bait support may be a container such as a hollow wheel-like member or disc having means whereby it can be charged with bait, and if a soluble or dissolvable bait is used, openings are provided in the disc to allow dispersion of the bait during use. If desired, the disc may have flexible fins or paddles provided around its periphery so as to cause rotation of the disc during trawling and thereby assist in dispersing the bait. In addition, the disc may be weighted so as to be off balance and produce an irregular or thrashing movement in use so as to provide a visual attraction for fish.

According to a further modification, the bait may be moulded or otherwise attached directly around or to a support member such as a metal bar having means whereby it can be attached to a line and/or hook. The bar may have small cross pieces or other abutments thereon to assist in holding the bait against movement relative thereto.

It is also contemplated that the lure need not be attached to an actual fishing line, but could be simply deposited in the water to act as a primary attraction lure, and a hook or other bait retainer can be used on a fishing line located near the primary lure. Such primary lures can take any of the forms previously described in this specification, but ideally comprise a hollow container arranged to carry and disperse bait of any suitable form (e.g., powder, paste, block, or pellet). Preferably, such a container is formed of two separable parts or has a removable cap to allow recharging of bait. Also, a retrieval line is preferably secured to the container to enable it to be brought in for recharging.

Containers as described are preferably perforated or formed of mesh material so as to facilitate bait dispersal, and may be sold prepacked with bait in which case any convenient means may be provided to prevent premature discharge of bait - e.g., adhesive tape or a plastic bag or hood. The container can be made of metal, a plastics material, or any other suitable material.

Any of the embodiments so far described, may be self propelled by means of a spring motor operatively connected to a suitable drive element such as a rotatable wheel having vanes or cuts provided around the periphery thereof. The motor can be connected to the wheel through a gear tray or other connecting means, and it can be energized through manipulation of a removable key or the like.

In any of the hook-type lures described in this specification, a flexible fin or flap may be located adjacent the or each hook so as to guard against snagging. The fin or flap need not overlie the hook point, but can be so arranged if desired. Preferably, the fin or flap slopes outwardly from the body of the container or lure towards the hook point, and is disposed forwardly of that point in the normal direction of movement of the container or lure during retrieval. Such a fin or flap can be moulded or otherwise formed directly on to a hook stem or shank, and can be used with conventional hooks not strictly falling within the scope of the invention so far described.

A spinner or imitation fly or insect of any conventional construction may be also attached to any of the embodiments described.

Finally, it is to be understood that various alterations, modifications and/or additions may be introduced into the constructions and arrangements of parts previously described without departing from the spirit or ambit of the invention as defined in the appended claims.

I claim:

1. A fishing lure comprising a hollow body defining a bait receiving chamber having a longitudinal axis, said body having a forward end portion, a rearward end portion and a medial peripheral portion therebetween, said forward end portion terminating in a front face, a plurality of escape apertures formed in said medial peripheral portion for placing said chamber in fluid communication with the exterior of said lure whereby liquid may pass therethrough to the exterior, another aperture in said forward end portion for permitting the flow of liquid into said chamber and/or inserting bait into said chamber, said another aperture having an axis generally parallel to said longitudinal axis, and check-valve means mounted internally of said chamber for preventing the premature ejection of bait from said chamber to atmosphere through said another aperture.

2. The fishing lure as defined in claim 1 wherein said valve means is a flap valve.

3. The fishing lure as defined in claim 1 including means within said chamber for controlling the egress of bait outwardly therefrom through said peripheral portion apertures.

4. The fishing lure as defined in claim 2 including means within said chamber for controlling the egress of bait outwardly therefrom through said peripheral portion apertures, and said flap valve is formed as an integral portion of said bait egress controlling means.

5. The fishing lure as defined in claim 3 wherein said bait egress controlling means is permeable material covering said peripheral portion apertures.

6. The fishing lure as defined in claim 5 wherein said valve means is a flap valve formed from said permeable material covering adjacent said another aperture.

* * * * *